(12) United States Patent
Benmoussa et al.

(10) Patent No.: US 8,827,202 B2
(45) Date of Patent: Sep. 9, 2014

(54) METHOD OF MANAGING THE STEERING OF AIRCRAFT WHEELS, IN PARTICULAR IN THE EVENT OF A TIRE BURSTING OR DEFLATING

(75) Inventors: Michael Benmoussa, Antony (FR); Jerome Fraval, Velizy Villacoublay (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 342 days.

(21) Appl. No.: 13/546,215

(22) Filed: Jul. 11, 2012

(65) Prior Publication Data

US 2013/0015290 A1    Jan. 17, 2013

(30) Foreign Application Priority Data

Jul. 12, 2011    (FR) ...................................... 11 56326

(51) Int. Cl.
*B64C 25/50*    (2006.01)
*B64C 25/30*    (2006.01)
(52) U.S. Cl.
CPC .................. *B64C 25/30* (2013.01); *B64C 25/50* (2013.01)
USPC .............................. 244/50; 244/102 R; 701/3
(58) Field of Classification Search
USPC ....... 244/50, 103 R, 102 SS; 701/3, 16, 4, 38; 248/543
See application file for complete search history.

(56) References Cited

U.S. PATENT DOCUMENTS

| | | | | |
|---|---|---|---|---|
| 3,415,167 A | * | 12/1968 | Champagne | 92/26 |
| 3,605,568 A | * | 9/1971 | Nepp | 2/24 |
| 4,113,041 A | * | 9/1978 | Birkeholm | 180/14.1 |
| 4,991,862 A | * | 2/1991 | Tsao et al. | 280/421 |
| 5,167,385 A | * | 12/1992 | Hafner | 244/76 R |
| 5,613,651 A | * | 3/1997 | Meneghetti | 244/50 |
| 5,947,414 A | * | 9/1999 | Ralph | 244/50 |
| 6,065,719 A | * | 5/2000 | Ralph | 244/50 |
| 6,123,292 A | * | 9/2000 | Ralph | 244/50 |
| 7,630,805 B2 | * | 12/2009 | Lu et al. | 701/45 |
| 7,731,122 B2 | * | 6/2010 | Frank | 244/50 |
| 8,094,042 B2 | * | 1/2012 | Read et al. | 340/960 |
| 8,214,090 B2 | * | 7/2012 | Villaume et al. | 701/13 |
| 8,321,088 B2 | * | 11/2012 | Brown et al. | 701/38 |
| 2002/0124629 A1 | * | 9/2002 | Hurson | 73/9 |
| 2004/0177671 A1 | * | 9/2004 | Hurson | 73/9 |

(Continued)

FOREIGN PATENT DOCUMENTS

EP    1 739 010 A1    1/2007
EP    1 964 772 A1    9/2008

*Primary Examiner* — Christopher P Ellis
*Assistant Examiner* — Medhat Badawi
(74) *Attorney, Agent, or Firm* — Sughrue Mion, PLLC

(57) ABSTRACT

A method of managing the steering of aircraft undercarriage wheels carried by a steerable bottom portion of the undercarriage, the bottom portion being associated with steering control including a steering member suitable for steering the bottom portion of the undercarriage in response to a steering order. The method comprises the steps of (1) monitoring the pressures of the tires carried by the wheels, and in response to detecting at least one of the following events: (1A) the pressure of one of the tires is less than a first predetermined threshold, and ( 1B) the difference between the pressures of two of the tires is greater than a second determined threshold; (2) activating the steering control, if the steering control is not activated; and (3) implementing a steering control relationship that is modified compared with a nominal control relationship used when the tires are properly inflated.

7 Claims, 1 Drawing Sheet

(56) References Cited

U.S. PATENT DOCUMENTS

| | | | |
|---|---|---|---|
| 2005/0218263 A1* | 10/2005 | Udall | 244/102 R |
| 2006/0293805 A1* | 12/2006 | Garcia | 701/16 |
| 2008/0082246 A1* | 4/2008 | Brown et al. | 701/91 |
| 2008/0188998 A1* | 8/2008 | Venios et al. | 701/3 |
| 2008/0203217 A1* | 8/2008 | Frank | 244/50 |
| 2009/0231197 A1* | 9/2009 | Richards | 342/377 |
| 2009/0261197 A1* | 10/2009 | Cox et al. | 244/50 |
| 2011/0046819 A1* | 2/2011 | Bailbe et al. | 701/3 |
| 2011/0202208 A1* | 8/2011 | Karnik et al. | 701/7 |
| 2013/0015290 A1* | 1/2013 | Benmoussa et al. | 244/50 |
| 2013/0161445 A2* | 6/2013 | Bennett et al. | 244/50 |

* cited by examiner

METHOD OF MANAGING THE STEERING OF AIRCRAFT WHEELS, IN PARTICULAR IN THE EVENT OF A TIRE BURSTING OR DEFLATING

TECHNOLOGICAL BACKGROUND OF THE INVENTION

In general, aircraft possess a nosewheel undercarriage that includes a steerable bottom portion carrying the wheels of the undercarriage and associated with a steering control for steering the steerable bottom portion on the ground in order to facilitate movements of the aircraft. The invention relates more particularly to direct undercarriages in which the bottom portion forms the sliding portion of the shock absorber of the undercarriage.

When the undercarriage is extended prior to landing, the bottom portion is kept pointing straight ahead, i.e. on the axis of the aircraft, by means of cams arranged on the bottom portion and on the non-steerable portion of the undercarriage, the cams being held in co-operation by the pressure inside the shock absorber.

When the aircraft lands, the bottom portion of the undercarriage is pushed into the undercarriage so that the cams move apart. Once the speed of the aircraft has dropped below a given threshold, steering control is activated, while continuing to keep the bottom portion of the undercarriage pointing straight ahead until the pilot starts steering the wheels.

Nevertheless, there is a risk of one of the tires being deflated or bursting during the stage in which steering is not being controlled. Under such conditions, the bottom portion swivels under the effect of the drag due to greater ground friction applied to the wheel having the properly inflated tire, and this can lead to the wheels being put at right angles relative to the direction of travel, thereby bursting the tires and damaging the rims of the wheels.

In addition, while taxiing after landing or before takeoff, significant deflation or bursting of one of the tires runs the risk of deflecting the aircraft or of damaging the undercarriage because of a sudden swiveling lurch.

OBJECT OF THE INVENTION

An object of the invention is to provide a method of managing the steering of the wheels of an undercarriage while avoiding any swiveling of the steerable bottom portion, in particular at the moment the wheels touch the ground.

BRIEF SUMMARY OF THE INVENTION

In order to achieve this object, the invention provides a method of managing the steering of aircraft undercarriage wheels carried by a steerable bottom portion of the undercarriage, the bottom portion being associated with steering control including a steering member suitable for steering the bottom portion of the undercarriage in response to a steering order. According to the invention, the method comprises the steps of:
  monitoring the pressures of the tires carried by the wheels, and in response to detecting at least one of the following events:
    the pressure of one of the tires is less than a first predetermined threshold; and
    the difference between the pressures of two of the tires is greater than a second determined threshold;
  activating the steering control, if the steering control is not activated; and
  implementing a steering control relationship that is modified compared with a nominal control relationship used when the tires are properly inflated.

This method is advantageously implemented during stages of landing or takeoff, in particular while steering control is normally deactivated. Thus, the method enables steering control to be activated quickly as soon as one of the above-mentioned events is detected, thereby enabling the steering control to be operated immediately in application of the modified control relationship, thus preventing or at least reducing any swiveling of the wheels and the associated damage.

Naturally, if steering control is already activated, it then suffices to change from the nominal control relationship to the modified control relationship in response to detecting the above-mentioned events.

Naturally, the above is meaningful only if it is detected that at least one of the wheels of the undercarriage in question is in contact with the ground.

DESCRIPTION OF THE FIGURES

The invention can be better understood in the light of the following detailed description given with reference to the figures, in which.

DETAILED DESCRIPTION OF AN EMBODIMENT OF THE INVENTION

Figure 1:
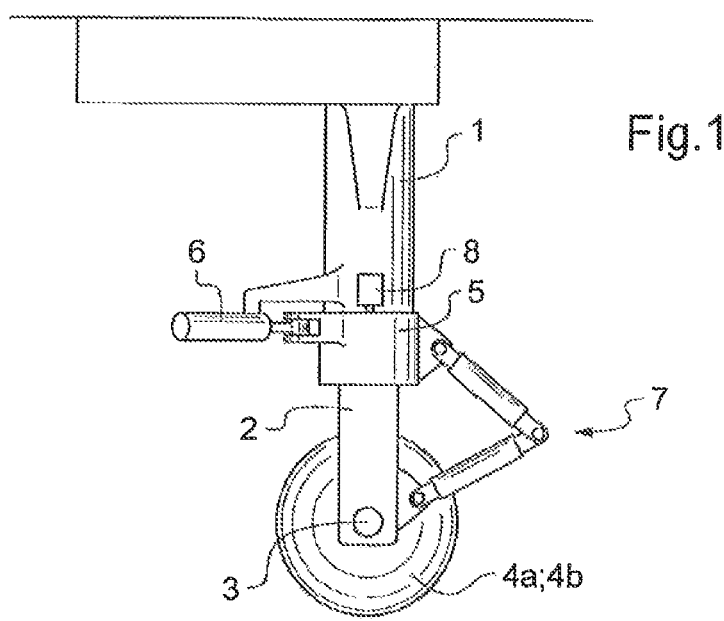
FIG. 1 is a side view of an aircraft nosewheel undercarriage.
Figure 2:
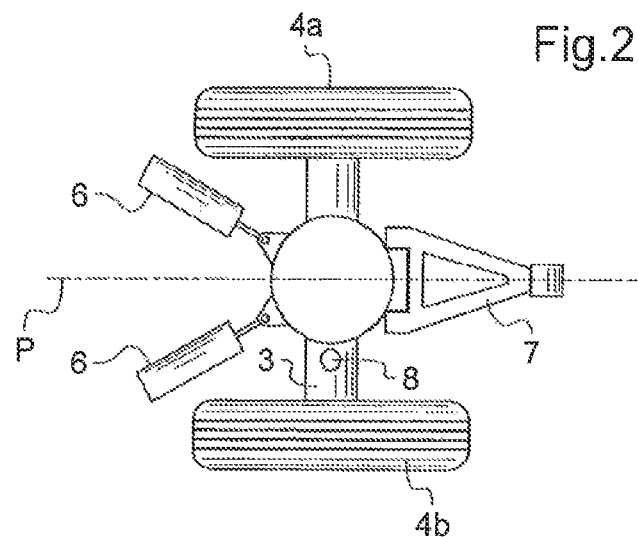
FIG. 2 is a plan view of the FIG. 1 undercarriage.

The invention is described herein with reference to an aircraft nosewheel undercarriage, e.g. an undercarriage having two steerable wheels.

Such an aircraft nosewheel undercarriage typically has a strut 1 hinged to the structure of the aircraft. A brace member (not shown) extending between the structure of the aircraft and the strut enables the strut 1, and thus the undercarriage, to be stabilized in its deployed position, as shown.

A rod 2 slides in the strut 1, the bottom end of the rod 2 carrying an axle 3 receiving wheels 4a and 4b. A collar 5 is mounted to turn on the bottom portion of the strut 1 and to be steered in controlled manner by a steering member, implemented in this example by push-pull mounted actuators 6. The collar 5 and the rod 2 are constrained to turn together by a scissors linkage 7, such that steering the collar 5 serves to steer the rod 2 and thus to steer the wheels 4a and 4b. At least one angular position sensor is arranged on the strut to measure the angular position of the collar 5, and thus of the wheels 4. The angular position sensor 8 delivers angular position information that is used by a steering computer arranged in the aircraft and controlling the steering of the wheels 4a and 4b in response to a steering order issued by the pilot, by pressing on pedals or by turning a steering wheel.

Figure 3:
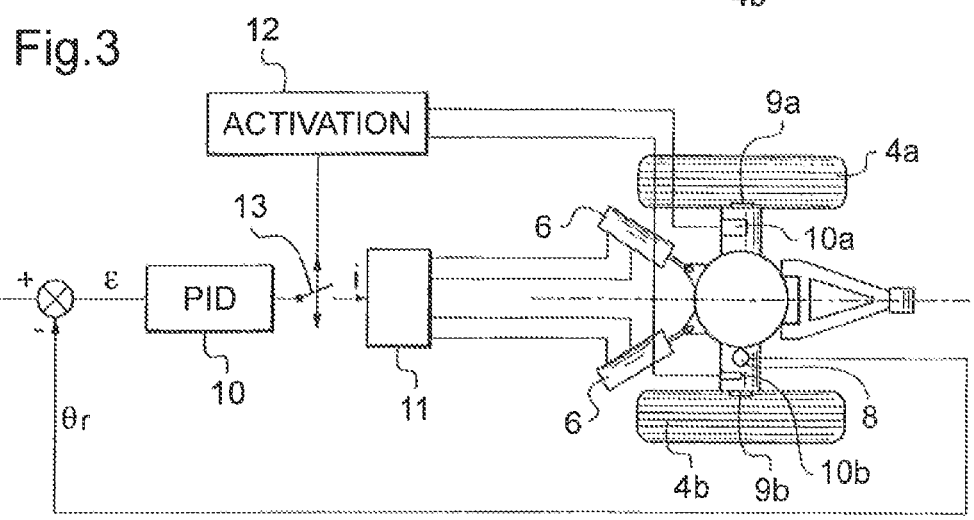
FIG. 3 is a diagram of the servo-control for implementing the method of the invention.

The servo-control is shown in FIG. 3, where it can be seen that the feedback signal $\theta r$ is constituted by the angular position information generated by the angular position sensor 8. More precisely, the servo-control that is implemented by the steering computer involves calculating an error 8 between the steering setpoint $\theta$, e.g. coming from the steering wheel in the cockpit, and the feedback signal $\theta r$. The error is delivered in this example to a proportional integral differential (PID) controller 10 that generates control current i delivered to a servo-valve 11 that feeds the actuators 6 of the steering member.

The above is well known and is recalled merely by way of information in order to situate the context of the invention.

During landing, the rod that co-operates with the strut to form a telescopic shock absorber is to be found in the extended position. In this position, a cam secured to the rod co-operates with a cam secured to the strut to keep the wheels 4a and 4b pointing straight ahead on the axis of the aircraft, as shown. In general, steering control is inhibited while landing in order to avoid any untimely swiveling of the wheels as a result of a failure of the steering member or of the steering computer. Steering control is generally activated only once the wheels have touched the ground (and thus the rod has begun to penetrate into the strut and the two cams have moved apart), and the longitudinal speed of the aircraft has also dropped below a predetermined threshold.

Nevertheless, if the wheels of the undercarriage touch the ground while the pressures in the tires are very different, the force from the ground will pass in preferred manner via the wheel having the tire that is the more inflated, thereby generating a pivoting moment on the steerable portion of the undercarriage, which can cause the steerable portion to swivel even though the steering control has not yet been activated.

In order to avoid such an event, and in accordance with the invention, the pressures Pa and Pb in the two tires are monitored using respective pressure sensors 9a and 9b. By way of example, it is possible to use sensors installed on the rims of the wheels in order to measure the pressures that exist inside the tires, the sensors communicating via antennas with receivers 10a and 10b placed in the axle of the wheels. The signals from the receivers 10a and 10b are delivered to an activation member 12 that is shown controlling a switch 13 for selectively authorizing control current i to be delivered to the servo-valve 11.

By means of the pressure sensors 9a and 9b, the following events can be detected:

the pressure measured in one of the tires is less than a first determined threshold P1, i.e. Pa≤P1 or Pb≤P1; and/or the difference between the pressures measured by the pressure sensors 9a and 9b is greater than a second determined threshold P2, i.e. |Pa−Pb|≥P2.

In the first case it is likely that one of the tires is punctured, whereas in the second case it is likely that one of the tires is deflated.

In the invention, when either of these situations is detected, the activation member 12 is adapted to activate the steering control, if it is not already activated, in order to counter any tendency of the steerable bottom portion of the undercarriage to swivel. In practice, the activation member 12 closes the switch 13, thereby enabling the servo-valve 11 to be controlled by angular position servo-control. The steering control as activated in this way keeps the steerable bottom portion on the axis until the pilot orders some other steering angle. Thus, landing can continue with the wheels pointing straight ahead, even with a tire that has burst or that is seriously deflated.

In the invention, once steering control has been activated in response to detecting either of the above events, steering control is programmed to implement a control relationship that is modified relative to the nominal control relationship that is used in the nominal situation in which both tires are properly inflated.

Preferably, the modification(s) is/are selected from the actions listed below:

limiting the steering angle of the steerable portion of the undercarriage (e.g. ±45°) so as to allow wide turns only and prevent tight about-turns;

limit the maximum speed of the aircraft at which the wheels can be steered (e.g. 5 knots) so as to permit taxiing at low speed only;

limit the angular speed at which the wheels can be steered (e.g. ±5 degrees per second) in order to avoid any sudden movement;

increase the sensitivity of control at small angles (e.g. steering through 2.5 degrees for a setpoint of 5 degrees, i.e. a factor of 2) in order to avoid steering through excessive amplitudes;

increasing the dead region in order to avoid the steerable portion of the undercarriage oscillating around 0 degrees; and reducing the dynamics of control by modifying the gains used in the control, or even the structure of the corrector used.

Naturally, if steering control has already been activated and is in operation implementing the normal control relationship, then on detecting either one of the above-mentioned events, the nominal control relationship will be caused to change to the modified control relationship.

The method of the invention may naturally be applied to all stages in which the wheels are touching the ground, whether or not steering control is deactivated.

What is claimed is:

1. A method of managing the steering of aircraft undercarriage wheels carried by a steerable bottom portion of the undercarriage, the bottom portion being associated with a steering control including a steering member suitable for steering the bottom portion of the undercarriage in response to a steering order, wherein the method comprises the steps of:

monitoring pressures of tires carried by the wheels, and in response to detecting either of the following events:

a pressure of one of the tires is less than a first predetermined threshold; and a difference between the pressures of two of the tires is greater than a second determined threshold;

activating the steering control if the steering control is not activated; and implementing a steering control that is modified with respect to a nominal control condition existing when the tires are properly inflated to a reference level.

2. A method according to claim 1, wherein the modified steering control relationship is modified relative to the nominal control condition in application of one or more of the following actions:

limiting a steering angle of the steerable portion of the undercarriage;

limiting a maximum speed of the aircraft at which the wheels are steered;

limiting an angular speed at which the wheels are steered;

increasing a sensitivity of the steering control at small angles;

increasing a dead region around 0 degrees; and reducing a dynamics of the steering control.

3. The method according to claim 2, wherein the steering angle is adjusted approximately to ±45 degrees.

4. The method according to claim 2, wherein the maximum speed of the aircraft at which the wheels can be steered is approximately less than 5 knots.

5. The method according to claim 2, wherein the angular speed at which the wheels are steered is approximately ±5 degrees per second.

6. The method according to claim 1, wherein sensitivity of the steering control at small angles is increased approximately by a factor of 2.

7. The method according to claim 1, wherein dynamics of the steering control is increased.

\* \* \* \* \*